SAUER & COERVER.
Grain Winnower.
No. 110,291. Patented Dec. 20, 1870.
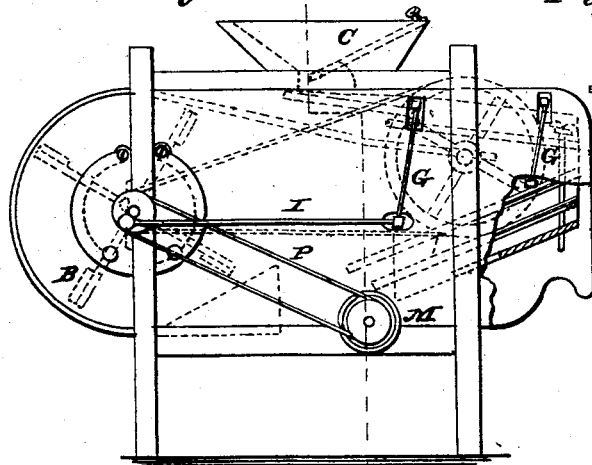
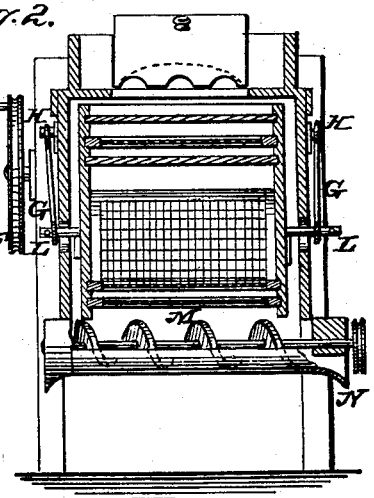
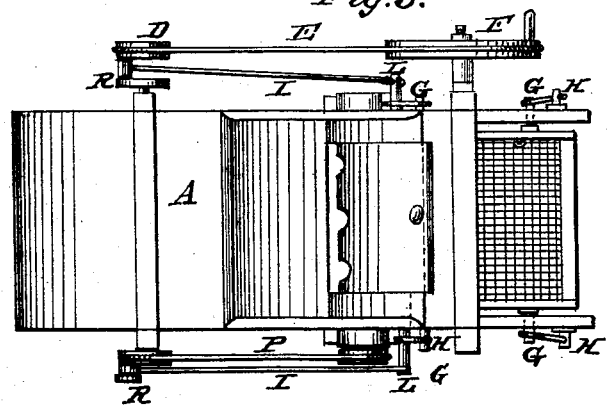

United States Patent Office.

FRANK SAUER AND JOHN COERVER, OF WATERLOO, ILLINOIS.

Letters Patent No. 110,291, dated December 20, 1870.

IMPROVEMENT IN FANNING-MILLS.

The Schedule referred to in these Letters Patent and making part of the same.

*To all whom it may concern:*

Be it known that we, FRANK SAUER and JOHN COERVER, of Waterloo, in the county of Monroe and State of Illinois, have invented a new and improved Fanning-Mill; and we do hereby declare that the following is a full, clear, and exact description thereof, which will enable others skilled in the art to make and use the same, reference being had to the accompanying drawing forming part of this specification.

This invention relates to improvements in fanning-mills, and consists in the improved combination and arrangement of the several parts, all as hereinafter described.

Figure 1 is a side elevation of our improved fanning-mill, a part being broken out to show the arrangement of the sieves.

Figure 2 is a transverse section taken on the line *x x* of fig. 1.

Figure 3 is a plan view of the same.

Similar letters of reference indicate corresponding parts.

The frame or case A, the fan B, and the hopper are arranged substantially the same as in other machines.

The fan-shaft is driven by a small pulley, D, worked by a band, E, and large driver, F, the latter mounted on a stud-pin projecting from the side of the case, near the end where the sieves are suspended.

The sieve-frame is suspended by four hangers, G, from four stud-pins, H, two projecting from each side of the case, so that the said sieve-frame may move to and from the fan-shaft in shaking.

The shaking motion is imparted by two connecting-rods, I, one on each side, attached to cranks K on the fan-shaft, and to stud-pins L projecting through the fanning-mill case.

M is a conveyer or screen arranged in a trough under the lower ends of the screens, so as to receive the grain and convey it out at the spout N, on one side.

This conveyer is worked by a belt, P, from a pulley on the fan-shaft, as clearly shown in figs. 1 and 3.

It will be seen that, by the employment of the two cranks and connecting-rods for working the screen-case, the friction and wear of the connections are so divided up that the effect is much less injurious than when only one crank and connecting-rod is used. Moreover, the strain being expended alike on both sides of the case, is less injurious, and the machine will stand more steady on the floor.

Another advantage of this arrangement is that the screen-case, being so arranged as not to strike against the sides of the fan, runs much smoother, and with less noise than when arranged in the common way.

The employment of the conveyer in the manner described is a great convenience for delivering the grain into sacks or any other receptacle.

Having thus described our invention,

We claim as new and desire to secure by Letters Patent—

The fan B, shaft O, driver F, pulleys D, cranks R, hangers G, connecting-rods I, belts E and P, and conveyer M, when said parts are constructed, combined, and arranged for operation substantially as and for the purpose described.

FRANK SAUER.
JOHN COERVER.

Witnesses:
 GEO. PINKEL,
 LOUIS BESSCHE, Jr.